(12) United States Patent
Allen et al.

(10) Patent No.: US 12,113,342 B2
(45) Date of Patent: Oct. 8, 2024

(54) RE-ENTERABLE ENCLOSURE WITH ENVIRONMENTAL SEALING

(71) Applicant: COMMSCOPE TECHNOLOGIES LLC, Hickory, NC (US)

(72) Inventors: Barry Wayne Allen, Siler City, NC (US); William B. Bryan, Fuquay-Varina, NC (US); Gail L. Joyner, Fuquay-Varina, NC (US)

(73) Assignee: CommScope Technologies LLC, Hickory, NC (US)

( * ) Notice: Subject to any disclaimer, the term of this patent is extended or adjusted under 35 U.S.C. 154(b) by 198 days.

(21) Appl. No.: 17/438,819

(22) PCT Filed: Mar. 11, 2020

(86) PCT No.: PCT/US2020/022078
§ 371 (c)(1),
(2) Date: Sep. 13, 2021

(87) PCT Pub. No.: WO2020/185882
PCT Pub. Date: Sep. 17, 2020

(65) Prior Publication Data
US 2022/0131355 A1 Apr. 28, 2022

(51) Int. Cl.
*H02G 3/08* (2006.01)
*G02B 6/44* (2006.01)

(52) U.S. Cl.
CPC .......... *H02G 3/088* (2013.01); *G02B 6/4441* (2013.01); *H02G 3/083* (2013.01)

(58) Field of Classification Search
CPC ....... G02B 6/4441; H02G 3/088; H02G 3/083
See application file for complete search history.

(56) References Cited

U.S. PATENT DOCUMENTS

| 5,525,073 | A | * | 6/1996 | Sampson | ............... | H02G 15/18 |
| | | | | | | 439/358 |
| 7,141,738 | B2 | | 11/2006 | Marsac et al. | | |
| 7,603,018 | B2 | | 10/2009 | Mullaney et al. | | |
| 8,642,891 | B2 | | 2/2014 | Berghmans et al. | | |
| 2005/0271344 | A1 | | 12/2005 | Grubish et al. | | |
| 2008/0169116 | A1 | | 7/2008 | Mullaney et al. | | |

(Continued)

FOREIGN PATENT DOCUMENTS

| WO | 2017/046065 A1 | 3/2017 |
| WO | 2017/046187 A2 | 3/2017 |

OTHER PUBLICATIONS

Extended European Search Report for Application No. 20769163.5 mailed Feb. 3, 2023.

(Continued)

*Primary Examiner* — Tina M Wong
(74) *Attorney, Agent, or Firm* — Merchant & Gould P.C.

(57) ABSTRACT

An enclosure includes a housing having an elongate length between first and second ends, the housing defining a cable pass-through location at a first end, the housing including a first housing piece and a second housing piece that pivotally couple together at the first end of the housing. Each housing piece carries a respective cable sealant module that compress together as the housing is closed. A sealing projection on one of the housing pieces inhibits gel of the sealant modules from extruding into a perimeter seal of the housing.

18 Claims, 9 Drawing Sheets

(56) References Cited

U.S. PATENT DOCUMENTS

| | | |
|---|---|---|
| 2011/0194830 A1 | 8/2011 | Mullaney et al. |
| 2013/0081849 A1 | 4/2013 | Simmons |
| 2018/0039037 A1 | 2/2018 | Aznag et al. |
| 2018/0059348 A1* | 3/2018 | Burkett ............... G02B 6/4444 |
| 2018/0252887 A1 | 9/2018 | Coenegracht et al. |
| 2021/0011239 A1 | 1/2021 | Geens et al. |

OTHER PUBLICATIONS

International Search Report and Written Opinion of the International Searching Authority for International Patent Application No. PCT/US2020/022078 mailed Jul. 6, 2020, 13 pages.

* cited by examiner

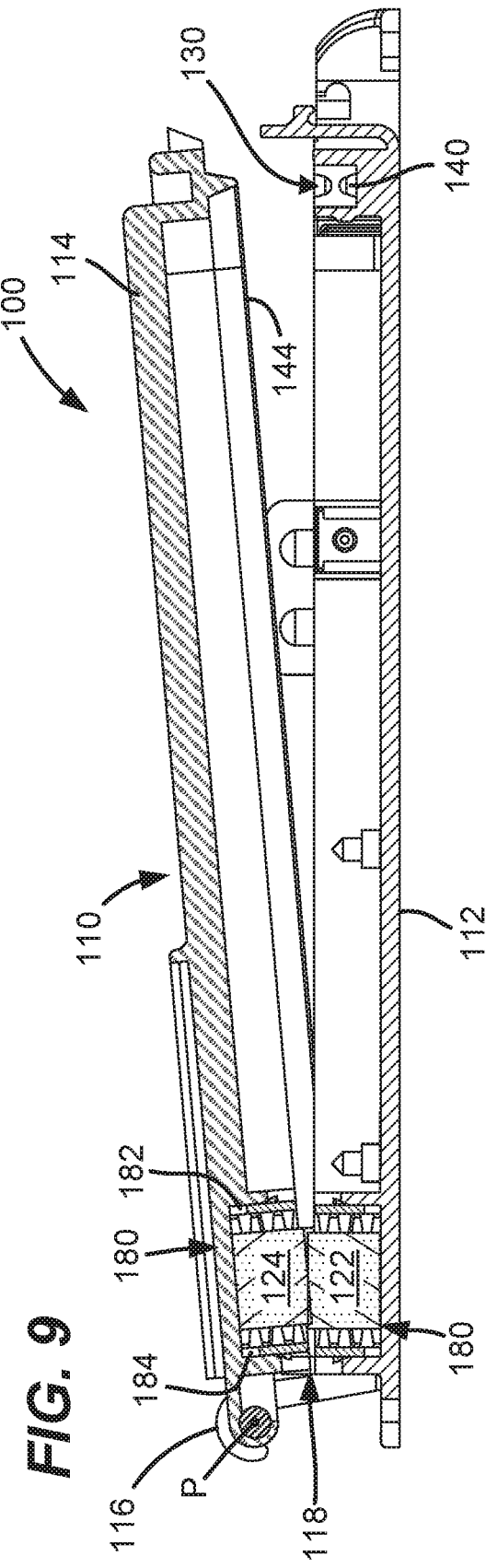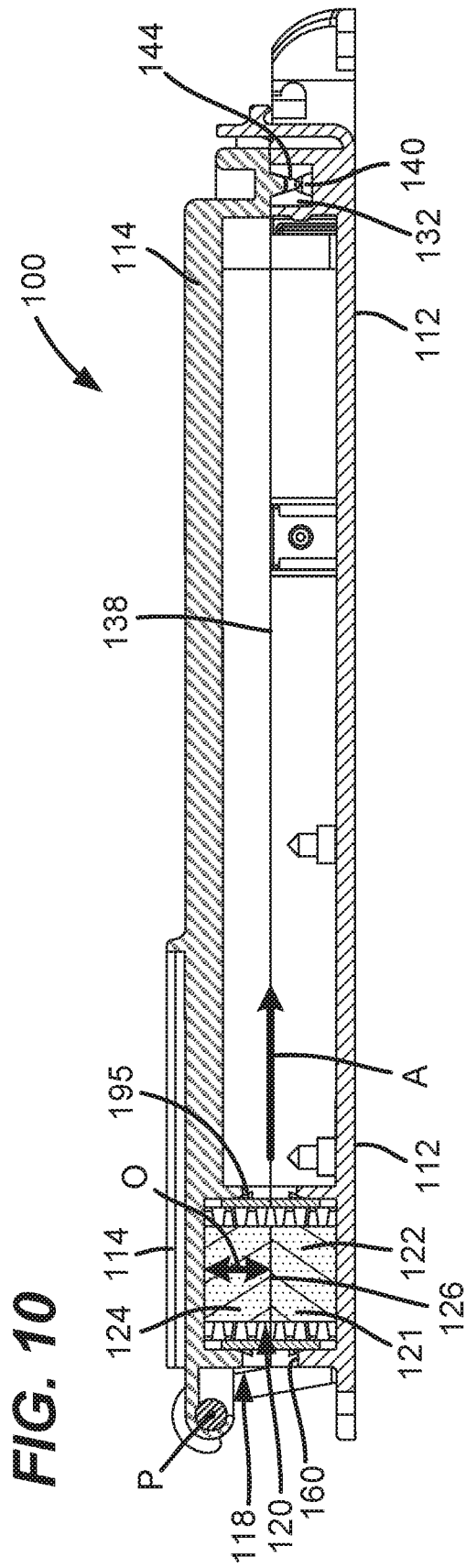

RE-ENTERABLE ENCLOSURE WITH ENVIRONMENTAL SEALING

CROSS-REFERENCE TO RELATED APPLICATION

This application is a National Stage Application of PCT/US2020/022078, filed on Mar. 11, 2020, which claims the benefit of U.S. Patent Application Ser. No. 62/817,898, filed on Mar. 13, 2019, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants.

SUMMARY

Some aspects of the disclosure are directed to an enclosure including a housing, a cable pass-through location provided at a first end of the housing; a sealant positioned at the cable pass-through location; and a hinge at the first end of the housing. The housing includes first and second housing pieces pivotally moveable relative to one another to move the housing between an open configuration and a closed configuration. The first and second housing pieces mate together and cooperating to define an interior of the housing when the housing is in the closed configuration. The interior of the housing is accessible when the housing is in the open configuration. The housing has a length, a width and a depth. The first and second housing pieces each extend along the length of the housing and cooperating to define the first and second ends of the housing separated by the length. The housing is elongate along the length. The first and second housing pieces each extend across the width of the housing. The first and second housing pieces cooperate to define the depth of the housing. The cable pass-through location enables cables to be routed through the first end of the housing into the interior of the housing. The sealant seals cables routed through the pass-through location. The sealant extends across the width of the housing. The sealant includes a first volume of sealant carried by the first housing piece and a second volume of sealant carried by the second housing piece. The first and second volumes of sealant meet at a sealing interface at least when the housing is in the closed configuration. Cables routed through the cable pass-through location are passed between the first and second volumes of sealant at the sealing interface. The housing includes a hinge at the first end for allowing pivotal movement between the first and second housing pieces such that the housing can be moved between the open and closed configuration. The hinge includes a pivot axis at the first end of the housing that extends across the width of the housing.

Other aspects of the disclosure are directed to an enclosure including a housing; a cable pass-through location provided at the first end of the housing; a sealant positioned at the cable pass-through location; and a hinge at the first end of the housing. The housing includes first and second housing pieces pivotally moveable relative to one another to move the housing between an open configuration and a closed configuration. The first and second housing pieces mate together and cooperate to define an interior of the housing when the housing is in the closed configuration. The interior of the housing is accessible when the housing is in the open configuration. The housing has a length, a width and a depth. The first and second housing pieces each extend along the length of the housing and cooperating to define first and second ends of the housing separated by the length. The housing is elongate along the length. The first and second housing pieces each extend across the width of the housing. The first and second housing pieces cooperate to define the depth of the housing. The cable pass-through location provided at the first end of the housing enables cables to be routed through the first end of the housing between the first and second housing pieces into the interior of the housing. The sealant is positioned at the cable pass-through location for sealing cables routed through the pass-through location. Cables routed through the cable pass-through location are passed through the sealant at a sealing interface. The housing includes a hinge at the first end for allowing pivotal movement between the first and second housing pieces such that the housing can be moved between the open and closed configuration. The hinge includes a pivot axis at the first end of the housing that extends across the width of the housing.

Other aspects of the disclosure are directed to an enclosure including a housing and a first sealant module. The housing includes first and second housing pieces moveable relative to one another to move the housing between an open configuration and a closed configuration. The first and second housing pieces mate together and cooperate to that define an interior of the housing when the housing is in the closed configuration. A cable pass-through location enables cables to be routed along a cable pass-through axis into the interior of the housing. The first housing piece defines a first receptacle adjacent the cable pass-through location. The first sealant module mounts within the first receptacle. The first sealant module includes first and second sealant containment plates respectively covering the inwardly and outwardly facing surfaces of the first volume of sealant. The outwardly facing surface of the first volume of sealant faces away from the interior of the housing and the inwardly facing surface faces toward the interior of the housing when the first sealant module is mounted in the first receptacle. The cable pass-through axis is transversely oriented relative to the inwardly and outwardly facing surfaces when the first sealant module is mounted in the first receptacle. The first volume of sealant also includes a cable sealing surface that extends between the inwardly and outwardly facing surfaces and also extends along the cable pass-through axis when the first sealant module is mounted within the first receptacle. The first and second sealant containment plates each include a main plate portion and a plurality of embedment projections that project from the main plate portion and embed into the first volume of sealant. The embedment projections have lengths that extend along the cable pass-through axis when the first sealant module is mounted within the first receptacle. A first snap-fit mechanical interface is defined between the first and second sealant containment plates and the first housing piece for retaining the first sealant module within the first receptacle.

Other aspects of the disclosure are directed to an enclosure including a housing; a perimeter seal; and a cable sealing arrangement. The first housing includes first and second housing pieces moveable relative to one another to move the housing between an open configuration and a closed configuration. The first and second housing pieces mate together and cooperate to that define an interior of the housing when the housing is in the closed configuration. The perimeter seal for sealing a mating interface between the first and second housing pieces extends about a perimeter of the housing. A cable pass-through location for routing cables along a cable pass-through axis into the interior of the housing includes a cable sealing arrangement. The first housing piece supports a first volume of sealant of the cable sealing arrangement and the second housing piece supports a second volume of sealant of the cable sealing arrangement. The cable sealing arrangement is located at one end of the housing and extends across a spacing between first and second portions the perimeter seal located at opposite sides of the housing. Opposite ends of the cable sealing arrangement are positioned adjacent the first and second portions of the perimeter seal. The first housing piece includes a channel for containing a third portion of the perimeter seal. The second housing piece includes a main body and a sealing projection that is unitary with the main body. The sealing projection includes a primary portion that extends along the mating interface and engages the third portion of the perimeter seal within the channel when the housing is in the closed configuration. The sealing projection also includes seal containment portions that extend beyond the channel between the ends of the cable sealing arrangement and the first and second portions of the perimeter seal to prevent the cable sealing arrangement from extruding into space designated for the perimeter seal when the housing is moved to the closed configuration. When the housing is in the closed configuration, the first and second volumes of sealant contact and are at least partially contained between inner sides of the seal containment portions and the first and second portions of the perimeter seal are compressed between outer sides of the seal containment portions and the first housing piece.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE FIGURES

The accompanying drawings, which are incorporated in and constitute a part of the description, illustrate several aspects of the present disclosure. A brief description of the drawings is as follows:

FIG. 9 is a cross-sectional view of the enclosure of FIG. 8 moved further towards the closed configuration so that the sealant of the first and second sealant modules is beginning to contact each other; the cross-hatching has been removed for ease in viewing; and FIG. 10 is a cross-sectional view of the enclosure of FIG. 9 disposed in the closed configuration; the cross-hatching has been removed for ease in viewing.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
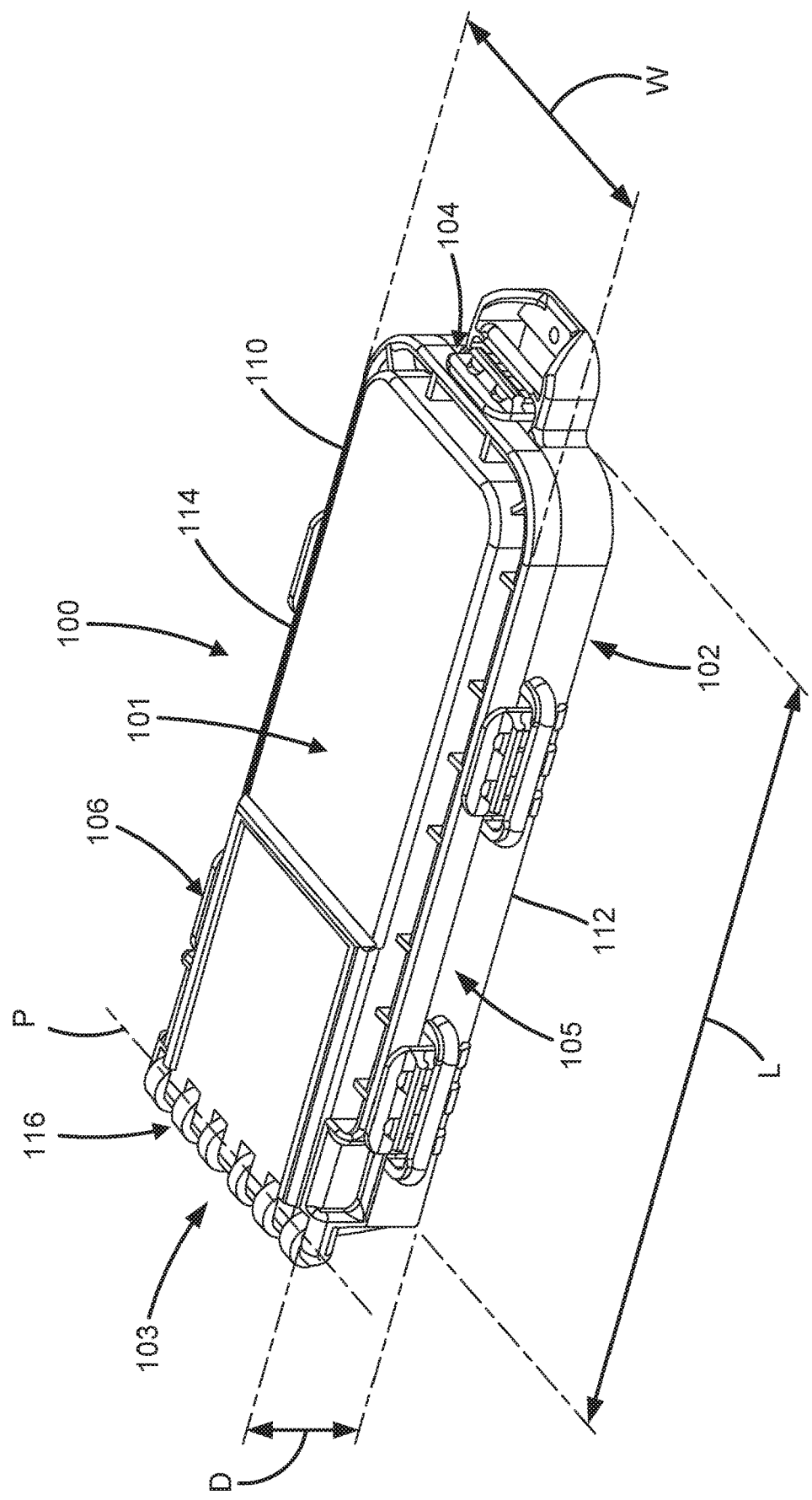
FIG. 1 is a perspective view of an example enclosure including a housing disposed in a closed configuration and configured in accordance with the principles of the present disclosure.
Figure 2:
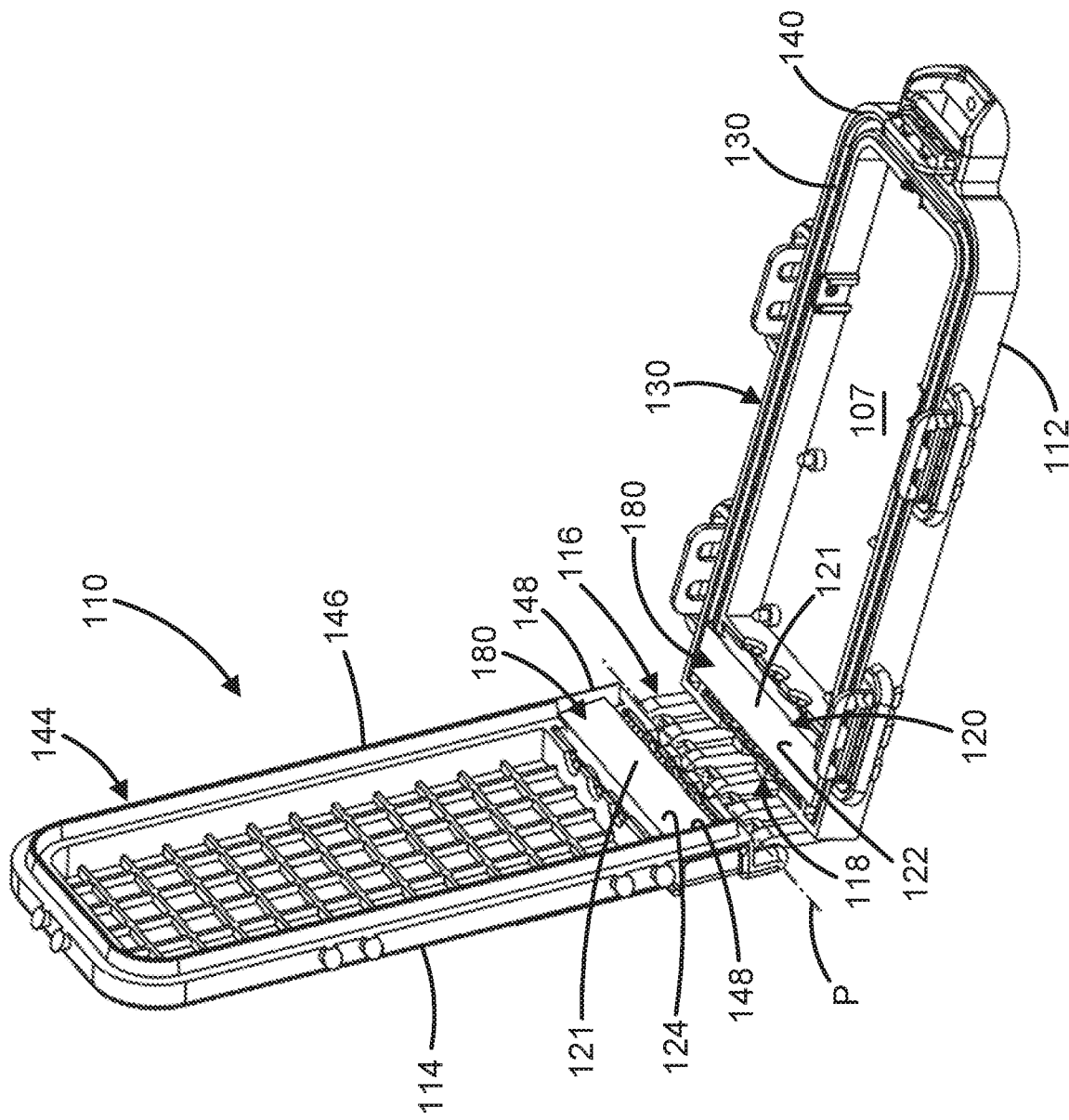
FIG. 2 is a perspective view of the enclosure of FIG. 1 with the housing disposed in an open configuration.

An enclosure 100 having a front 101, a rear 102, a first end 103, an opposite second end 104, a first side 105, and an opposite second side 106. The first and second sides 105, 106 of the enclosure 100 extend between the first and second ends 103, 104 of the housing 110. The enclosure 100 includes a housing 110 having a first housing piece 112 and a second housing piece 114. The second housing piece 114 is movable relative to the base 112 between a closed configuration (e.g., see FIG. 1) and an open configuration (e.g., see FIG. 2). For example, the first and second housing pieces 112, 114 are pivotal relative to each other to move the housing 110 between the open configuration and the closed configuration.

The first and second housing pieces 112, 114 mate together and cooperate to define an interior 107 of the housing 110 when the housing 110 is in the closed configuration. The interior 107 of the housing 110 is accessible when the housing 110 is in the open configuration. The housing 110 has a length L, a width W, and a depth D. The first and second housing pieces 112, 114 each extend along the length L of the housing 110. The first and second housing pieces 112, 114 cooperate to define first and second ends 103, 104 of the housing 110 separated by the length L. The first and second housing pieces 112, 114 each extend across the width W of the housing 110. The first and second housing pieces 112, 114 cooperate to define the depth D of the housing 110.

The housing 110 includes a hinge 116 at the first end 103 for allowing pivotal movement between the first and second housing pieces 112, 114 such that the housing 110 can be moved between the open and closed configuration. The hinge 116 includes a pivot axis P at the first end 103 of the housing 110 that extends across the width W of the housing 110. In certain examples, the hinge 116 includes a continuous hinge pin 117 that extends across the width W of the housing 110 (e.g., see FIG. 4). By making the hinge pin 117 continuous across the width W, more stability can be provided by the hinge 116.

A cable pass-through location 118 provided at the first end 103 of the housing 110 for routing cables through the first end 103 of the housing 110 into the interior 107 of the housing 110. The cable pass-through location 118 defines one or more cable ports or openings 160 through which the cables may extend along a cable pass-through axis A (e.g., see FIG. 10). The cable pass-through location 118 routes the cables between the first and second housing pieces 112, 114 and into the interior 107 of the housing 110.

A cable sealing arrangement 120 is positioned at the cable pass-through location 118 for sealing cables routed through the pass-through location 118. The cable sealing arrangement 120 includes sealant 121 that extends across the width W of the housing 110 (e.g., see FIG. 2). Cables routed through the cable pass-through location 118 are passed between the sealant 120 at a sealing interface 126.

The sealant 120 includes a first volume of sealant 122 carried by the first housing piece 112 and a second volume of sealant 124 carried by the second housing piece 114. The first and second volumes of sealant 112, 114 meet at the sealing interface 126 at least when the housing 110 is in the closed configuration (e.g., see FIG. 10). Cables routed through the cable pass-through location 118 are passed between the first and second volumes of sealant 122, 124 at the sealing interface 126.

In certain implementations, the first and second volumes of sealant 122, 124 are carried within first and second receptacles 170, 172, respectively, adjacent the cable pass-through location 118. The first receptacle 170 aligns with the second receptacle 172 when the housing 110 is disposed in the closed configuration.

In accordance with certain aspects of the disclosure, sealant materials (e.g., gel material) that may be used with any of the examples disclosed herein can have certain material properties adapted to facilitate cable size range taking and reliable sealing in systems that optionally may not include a separate actuator for pressurizing the sealant and for maintaining pressure on the sealant over extended times. For example, example sealant materials can be defined by properties such as hardness, compression set, resistance to extrusion, elongation to failure, and oil bleed out properties. Example value ranges for each property and testing procedures for measuring these values for sample materials are described below.

Indentation Hardness

The sealant material can be tested for indentation hardness using a texture analyzer including a load cell and a probe assembly. The load cell may be motor drive. The load cell may be bi-directional. The probe assembly includes a stainless-steel ball probe. The ball probe has a size of about 6.35 mm (0.25 in). The load cell has a minimum resolution of 0.20 g and ±0.5% FSR accuracy. The load cell has a trigger point of about 4 g. One example texture analyzer suitable for the hardness test is the Brookfield CT3 Model 1500 offered by Brookfield Engineering Laboratories, Inc. of Middleboro, MA.

During the test, the material to be tested is placed in a cup beneath the probe assembly. The cup is formed from aluminum. The cup is filled with 51 g of the material to be tested. The material filling the cup is bubble free. The cup has a frusto-conical inner shape having a major inner diameter of 50 millimeters at an open top end, a minor inner diameter of 45 millimeters at a closed bottom end, and a depth of 30 millimeters extending between the top and bottom ends.

The load cell drives the probe assembly vertically into a sample of material at a speed of 2 mm/sec to a depth of 4 mm. The load cell holds the probe assembly at the 4 mm depth for 1 hour.

The indentation hardness is measured (in grams) as a peak force and a residual force applied by the load cell to the probe assembly. The peak hardness is measured instantly when the probe assembly is at the pre-set depth from the trigger point. The residual hardness is measured at the pre-set depth after passage of the pre-set period of time. For example, the residual hardness may be measured after 1 hour (3600 seconds). In certain examples, an average and standard deviation are calculated for the peak force and residual force measurements. In one example, a sealing materials suitable for use in the gel sealing applications described herein have a residual indentation hardness ranging from 20 g to 80 g after 1 hour.

Compression Set

The sealant material can be tested for compression set under constant deflection in air. In certain examples, the material is tested using ASTM D395, Method B.

The material to be tested is formed into a cylindrical sample. The cylindrical sample has a diameter of about 20 mm and a height of about 20 mm.

The test is conducted using an oven (e.g., air-circulating) and a compression fixture. The compression fixture includes compression plates, spacers, and components to compress the plates. The compression plates are arranged in a vertical orientation so that the compression fixture has top and bottom compression plates. The compression plates and spacers are formed from steel. The plates have the dimensions 150 mm length×150 mm width×12.5 mm height. The spacers have the dimensions 25 mm width×10 mm height. The spacers each have an 8 mm center hole. The components to compress the plates include bolts and nuts. The bolts are 10 mm long.

During the test, the sample (e.g., the cylindrical sample) is placed on the compression fixture between the top and bottom compression plates so that the height of the sample extends along an axis between the top and bottom plates. The nuts and bolts are tightened to move the compression plates together to compress the sample. The spacers are positioned between the compression plates to limit the compression of the sample. In certain examples, the compression plates are moved relatively towards each other (e.g., the top plate is moved towards the bottom plate, the bottom plate is moved towards the top plate, or both plates are moved towards each other) until the compression plates are separated by a height of the spacers. For example, the sample may be compressed to a height of about 10 mm using 10 mm tall steel spacers.

The compressed sample is placed in the oven at a pre-set temperature for a pre-set period of time. In certain examples, the compression fixture and the sample are placed in the oven. The compression fixture holds the sample in the compressed state while in the oven. The compressed sample remains in the oven for 22 hours while the oven maintains an internal temperature of 70° C.

The heated sample and compression fixture are removed from the oven after the pre-set period of time. The top compression plate is removed from the sample to allow the sample to recover. For example, the nuts and bolts may be loosened and/or removed so that the top compression plate can be removed from the sample.

The height of the sample is measured after 100 hours of recovery time. The percent compression set is calculated by the following equation:

$$\text{Compression set} = \frac{(OH - PH)}{(OH - SH)} \times 100 \qquad (1)$$

where OH is the original sample height, PH is the sample height after testing and recovering, and SH is the spacer height.

In one example, a sealing materials suitable for use in the gel sealing applications described herein have a compression set of less than 10 percent after 100 hours of recovery time, or less than 5 percent after 100 hours of recovery time, or less than 2 percent after 100 hours of recovery time.

Resistance to Extrusion

The sealant material can be tested for resistance to extrusion using an extrusion fixture, a pneumatic cylinder, and an oven (e.g., an air-circulating oven). The extrusion fixture includes a body defining an interior test chamber and an extrusion plate that selectively covers a first end of the test chamber. The test chamber is cylindrical in shape and as a diameter of 25 millimeters. The extrusion plate closing one end of the test chamber defines a 4 mm circular opening in its center in fluid communication with the test chamber.

The material to be tested is formed into a cylindrical sample having a diameter of 25 mm and a height of 25 mm.

During the test, the sample is placed inside the cylindrical test chamber and the extrusion plate is placed over the first end of the test chamber. An aluminum cup is placed outside the extrusion fixture beneath the circular opening.

A compression plate is placed behind the sample at an opposite second end of the test chamber. The compression plate is round with a diameter of 25 mm. The compression plate is low friction and formed of plastic. A pneumatic cylinder is operationally coupled to the compression plate to move the compression plate relative to the extrusion fixture. In particular, compression rods of the pneumatic cylinder contact the plastic compression plate.

The pneumatic cylinder is energized and pressurized such that the pneumatic cylinder applies 200 kPa of pressure to the sample. The pressurized sample and pneumatic cylinder are placed in the oven at 70° C. Materials that are not extrusion resistant will fall into the aluminum cups. Materials that are extrusion resistant will bulge out of the opening in a bulbous extrusion. If no part of the sample falls into the aluminum cup, then the pressure is removed from the sample after 24 hours. The sample is allowed to recover with no pressure applied and allowed to return to room temperature. Once the sample returns to room temperature, the volume (if any) that remains extruded in a bulge outside the extrusion plate is measured. In certain examples, suitable materials will have a measured volume of no more than 0.5 $cm^3$, or no more than 0.25 $cm^3$ or 0 $cm^3$.

Elongation to Failure

The sealant material can be tested for tensile elongation using ASTM D638. For example, the material can be tested using a Universal Test Machine (UTM), such as a Universal Testing System offered by Instron of Norwood, MA The UTM includes a 2 kg load cell and two cylindrical rods. Each cylindrical rod has a 6 mm diameter and is formed of steel. The rods are each horizontally oriented with a lower rod attached to a stationary base of the UTM and an upper rod attached to the load cell. Accordingly, the lower rod remains stationary relative to the base while the upper rod is movable relative to the lower rod using the load cell.

The material to be tested is cut into rings having an outer diameter of 30 mm and an inner diameter of 20 mm. The rings have a thickness of 3-4 mm.

During the test, the rings are positioned so that the upper and lower rods extend into the rings. The load cell is moved at a rate of 50 mm/min. Accordingly, the upper rod moves away from the lower rod at that rate. As the upper rod is moved, the UTM measures a force applied to the upper rod versus the extension curve of the ring. From these measurements, the elongation to failure is calculated. The elongation to failure is calculated based on the initial length (approximately 31.5 mm) of the ring. In certain examples, suitable materials will have an elongation to failure of at least 300 percent, or 500 percent or 800 percent of the initial length of the sample.

Oil Bleed Out

The sealant material can be tested for oil bleed out to determine the oil loss of the material under pressure. The material to be tested is formed into multiple cylindrical samples each having a diameter of 14 mm and a thickness of 3-4 mm.

The test is performed using a test block, three coarse screens (0.16 $mm^2$ mesh), three fine screens (0.01 $mm^2$ mesh), three pistons, three weights, an analytical balance, and an oven. The test block defines three testing cavities having open upper ends. Each testing cavity is sized to receive one of the cylindrical samples through the open upper end. The weights are shaped to fit partially into respective testing cavities through the open upper ends.

During the test, the initial weight of each sample is measured. Each sample is placed on a respective fine screen. Then, each sample and corresponding fine screen is placed on a respective coarse screen. The screens support the samples while allowing low molecular weight material to separate. Each sample and corresponding screens is placed within one of the cavities defined in the test block.

A respective piston is placed over each sample within the respective testing cavity. A respective weight is placed over each piston to apply 120 kPa of pressure to the respective sample. The weight is shaped so that a portion of the weight extends downwardly into the testing cavity through the open upper end. The test block, screens, samples, pistons, and weights form a testing assembly. The testing assembly is placed in an air circulating oven.

At regular intervals, the testing assembly is removed from the oven and the samples are removed from the testing block. The samples are blotted on cleaning paper and weighed on an analytical balance. After weighing, the samples are replaced within the respective testing cavities and the weights are replaced over the samples. The testing assembly is returned to the oven. These regular intervals are repeated until at least 500 hours have elapsed or the sample weights have stabilized. In certain examples, the sample weight of suitable materials measured at 500 hours will be greater than or equal to 85% of the initial weight (e.g., less than 15% oil bleed out), or greater than or equal to 90% of the initial weight (e.g., less than 10% oil bleed out), or greater than or equal to 95% of the initial weight (e.g., less than 5% oil bleed out).

Example Sealant Materials

In certain implementations, sealant material for use in applications of the type disclosed herein includes a hydrosilation cured vinyl-terminated polydimethylsiloxane (PDMS) gel. Additional information on such a gel can be found in U.S. Pat. No. 8,642,891, the disclosure of which is hereby incorporated herein by reference in its entirety. In one example, the gel can be made by reacting a cross-linker, a chain extender and a vinyl-terminated polydimethylsiloxane (PDMS). In other implementations, sealant material for use in applications of the type disclosed herein include peroxide or heat cured vinyl-terminated PDMS gel. In other implementations, sealant material for use in applications of the type disclosed herein includes moisture (and/or UV) cured PDMS gel (various terminations possible, including silanol). In other implementations, sealant material for use in applications of the type disclosed herein includes moisture (and/or UV) cured, silylated polyether (commonly "MS polymer") gel. In certain implementations, the gel material includes polyether or polyester based polyurethane gel. In other implementations, sealant material for use in applications of the type disclosed herein includes chemically cross-linked polyacrylate (acrylic or methacrylic) e.g. n-butyl acrylate or ethyl-hexyl acrylate with triethylene glycol dimethacrylate. In other implementations, sealant material for use in applications of the type disclosed herein includes ionically crosslinked rubber gel. In other implementations, sealant material for use in applications of the type disclosed herein includes chemically crosslinked SBS family TPE gel (crosslinks in polystyrene phase only). In other implementations, sealant material for use in applications of the type disclosed herein includes physically crosslinked triblock polyacrylate gel (e.g. Kurarity®). In other implementations, sealant material for use in applications of the type disclosed herein includes physically crosslinked triblock olefin gel (e.g. Infuse). In other implementations, sealant material for use in applications of the type disclosed herein includes hybrids and/or multiple combinations of above chemistries.

Figure 3:
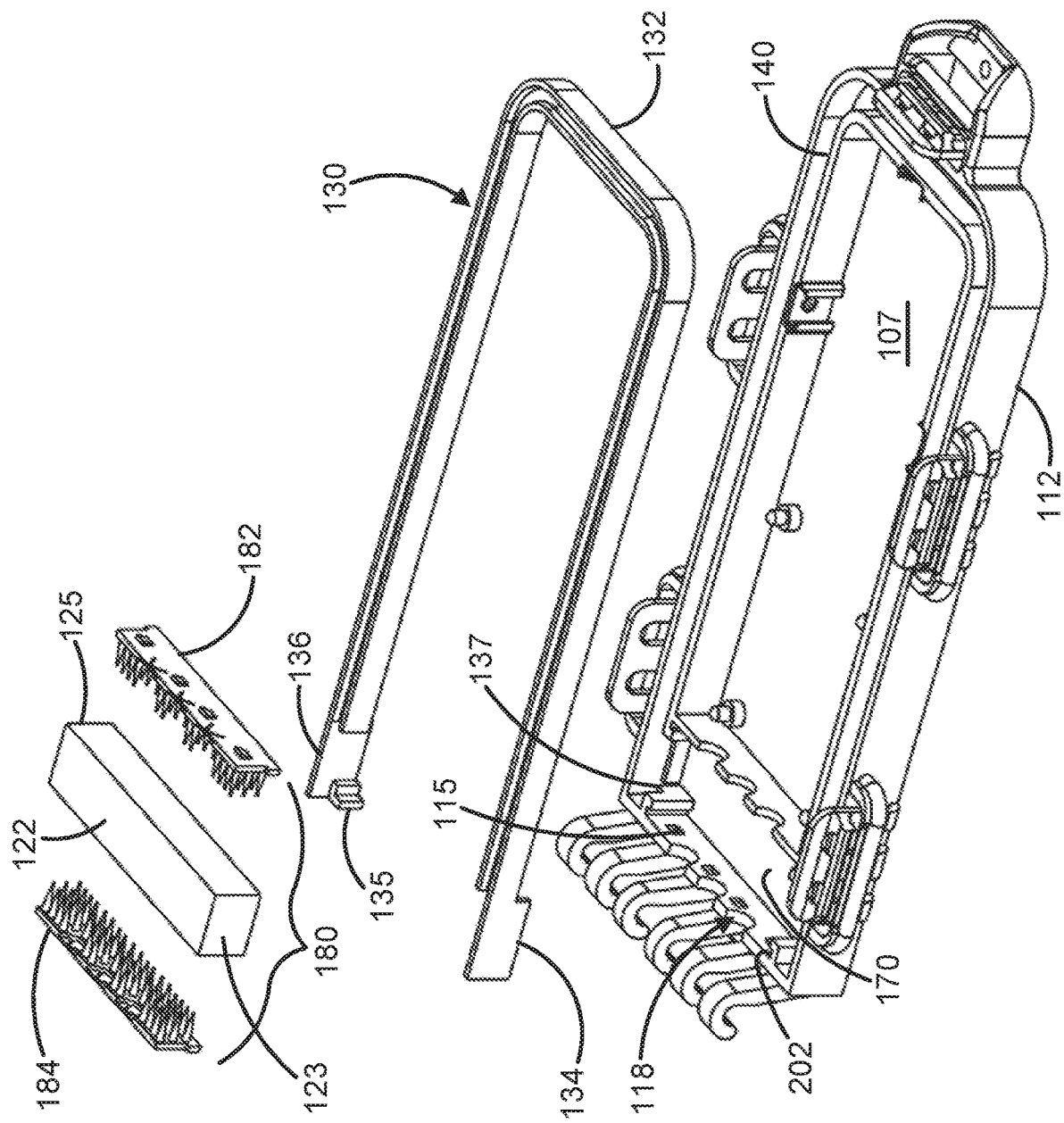
FIG. 3 is a perspective view of a first housing piece of the housing of FIG. 2 with a first sealant module of cable sealing arrangement and a perimeter seal exploded upwardly out of the first housing piece for ease in viewing.

Referring back to FIGS. 2-4, in certain implementations, each volume 122, 124 of sealant 121 forms part of a sealant module 180 that mounts within the respective receptacle 170, 172. In the example shown, a first sealant module 180 is disposed at the first receptacle 170 and a second sealant module 180 is disposed at the second receptacle 172. The first and second receptacles 170, 172 are disposed adjacent the cable pass-through location 118. Cables routed through the cable pass-through location 118 are sealed between the first and second sealant modules 180. In certain examples, the first and second sealant modules 180 are identical.

Figure 5:
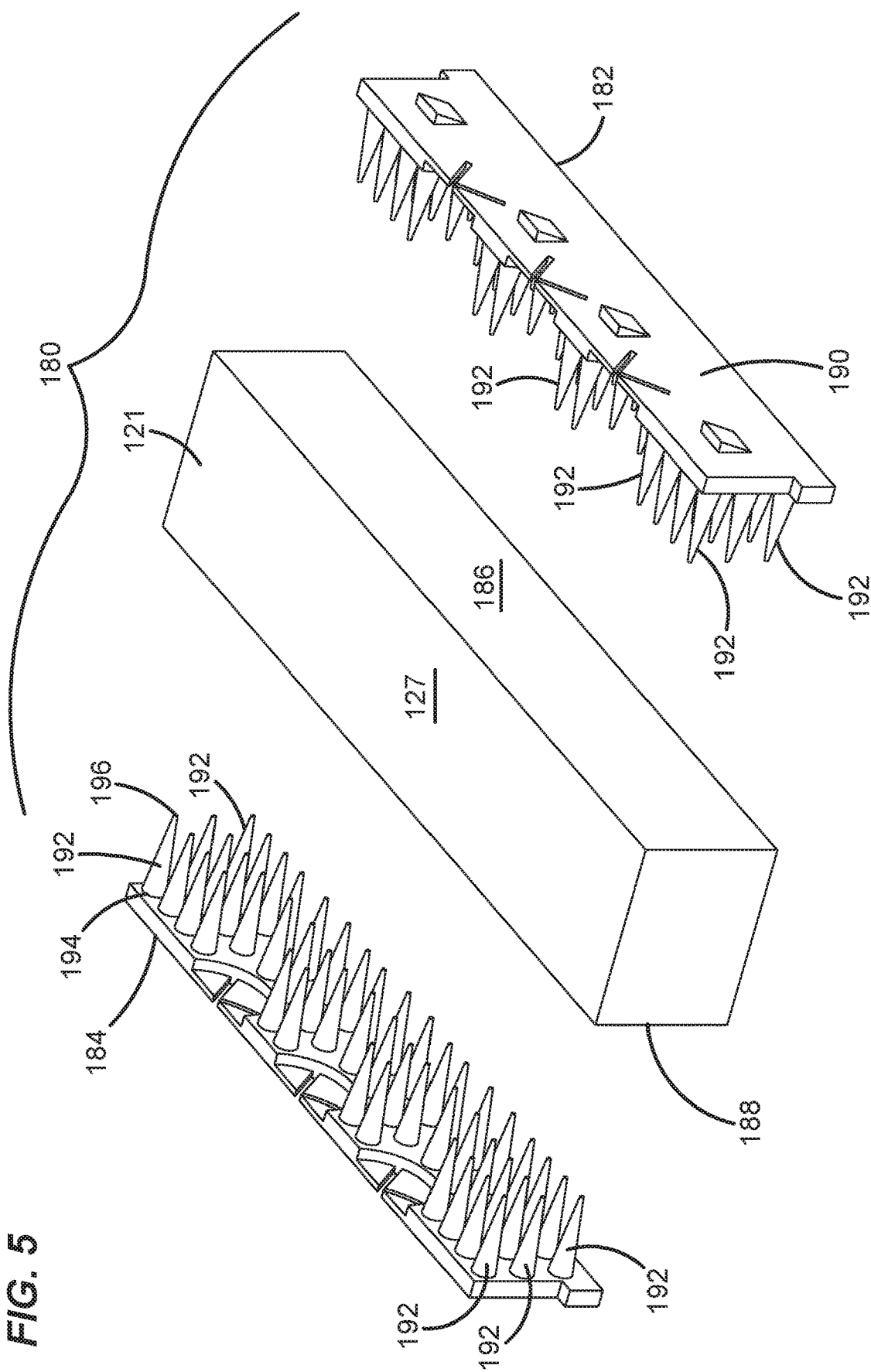
FIG. 5 is an exploded view of an example sealant module including a volume of sealant disposed between first and second containment plates.
Figure 6:
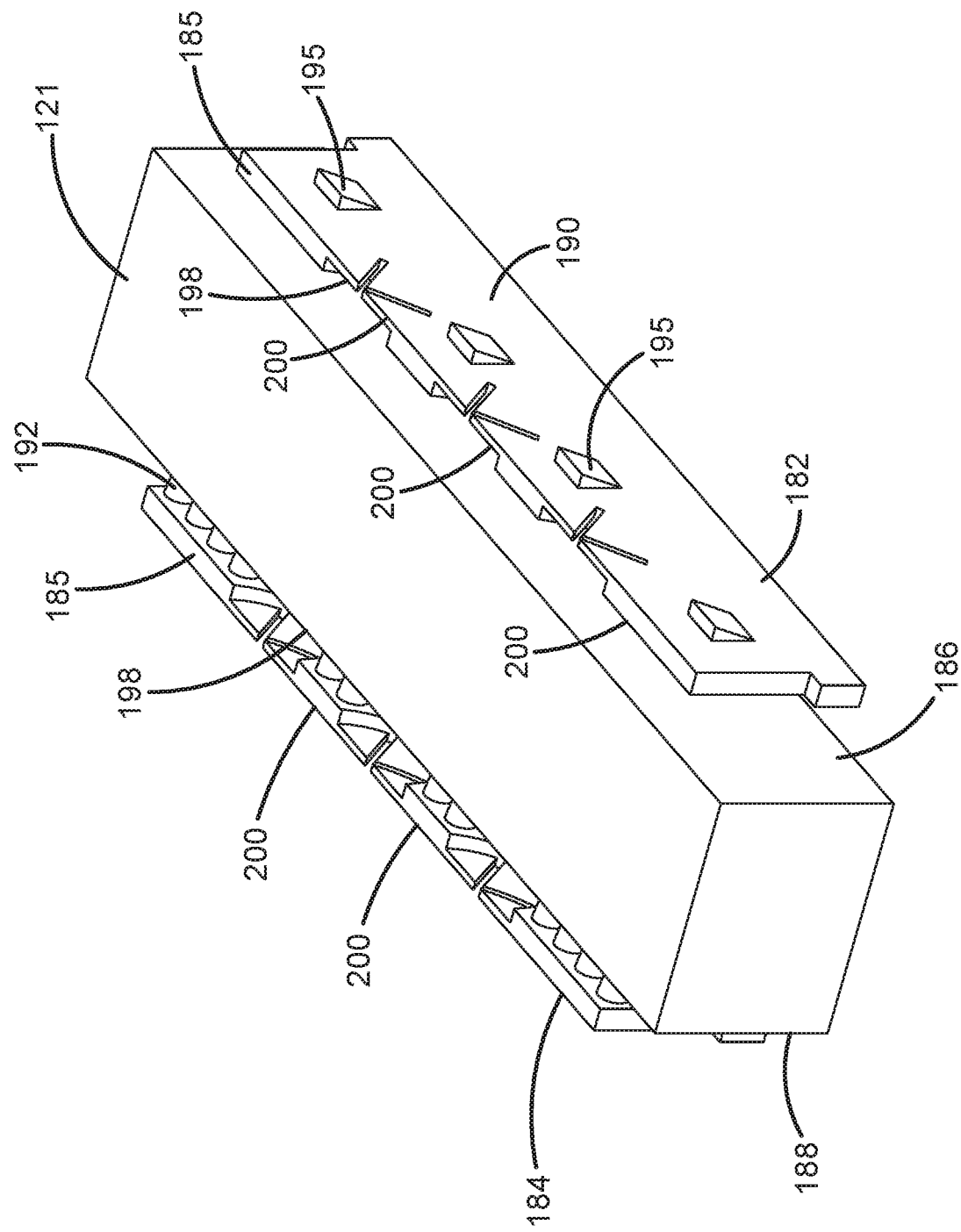
FIG. 6 is a perspective view of the sealant module of FIG. 5 in an assembled state.

Referring to FIGS. 5 and 6, each sealant module 180 includes first and second containment plates 182, 184 respectively covering inwardly and outwardly facing surfaces 186, 188 of the volume of sealant 121. The outwardly facing surface 188 of the sealant 121 faces away from the interior 107 of the housing 110 and the inwardly facing surface 186 of the sealant 121 faces toward the interior 107 of the housing 110 when the sealant module 180 is mounted in the respective receptacle 170, 172.

The cable pass-through axis A is transversely oriented relative to the inwardly and outwardly facing surfaces 186, 188 when the sealant module 180 is mounted in the respective receptacle 170, 172. The volume of sealant 121 also includes a cable sealing surface 127 that extends between the inwardly and outwardly facing surfaces 186, 188 and also extends along the cable pass-through axis A when the sealant module 180 is mounted within the respective receptacle 170, 172.

The first and second sealant containment plates 182, 184 each include a main plate portion 190 and a plurality of embedment projections 192 that project from the main plate portion 190 and embed into the first volume of sealant 122. In certain examples, the embedment projections 192 have lengths that extend along the cable pass-through axis A when the first sealant module 180 is mounted within the first receptacle 170 (e.g., see FIG. 7). In certain examples, the length of the projections 192 extend between base ends 194 and free ends 196. In certain examples, the free ends 196 of the embedment projections 192 of the first containment plate 182 face towards the first end 103 of the respective housing piece 112, 114 and the free ends 196 of the embedment projections 192 of the second containment plate 184 face towards the second end 104 of the respective housing piece 112, 114. The embedment projections 192 taper inwardly along the lengths as the embedment projections 192 extend toward the free ends 196. In the example shown, the embedment projections 192 are conical.

In certain implementations, only portions of the lengths of the embedment projections 192 are embedded in the volume of sealant 121. Void regions 198 are defined between the volume of sealant 121 and the main plate portions 190 for accommodating movement of the volume of sealant 121 when the volume of sealant 121 is pressurized about a cable routed through the volume of sealant 121.

The volume of sealant 121 includes a depth, a height and a length that are perpendicular relative to one another. The length of the sealant 121 extends between the ends 123, 125 of the sealant 121. The depth of the sealant 121 extends between the inwardly and outwardly facing surfaces 186, 188. The sealant module 180 is inserted into the respective receptacle 170, 172 along an insertion orientation that extends along the height of the sealant 121.

In certain implementations, a first snap-fit mechanical interface is defined between the first and second sealant containment plates 182, 184 of a sealant module 180 and the respective housing piece 112, 114 for retaining the sealant module 180 within the respective receptacle 170, 172.

The main plate portions 190 of the first and second sealant containment plates 182, 184 include flexible sealant containment tabs 200 that can flex to accommodate passage of cables through the main plate portions 182, 184. The tabs 200 are received within slots 202 of the respective housing 112, 114 when the sealant module 180 is inserted into the respective receptacle 170, 172 along the insertion orientation. In certain examples, the slots 202 are disposed within the receptacle 170, 172 defined by the respective housing piece 112, 114. The tabs 200 are positioned at insertion ends 185 of the main plate portions 190 of the first and second sealant containment plates 182, 184. The insertion ends 185 are at one end of the height of the sealant 121. In certain examples, the tabs 200 flex into the sealant 121 to facilitate insertion into the slots 202.

The main plate portions 190 of the first and second sealant containment plates 182, 184 include snap-fit elements 195. In certain implementations, the snap-fit elements 195 are offset from the tabs 200 in a direction along the height of the sealant 121 such that the sealant containment plates 182, 184 can flex in a cantilever fashion about the insertion ends 185 to provide a snap-fit mechanical interface with the respective housing piece 112, 114. In certain examples, the snap-fit elements 195 include snap-fit tabs that snap within snap-fit receptacles 115 defined by the respective housing piece 112, 114. For example, the tabs 200 may flex into the sealant 121 to allow the tabs 195 to snap into the receptacles 115. In certain examples, the receptacles 115 are disposed within the receptacle 170, 172 defined by the respective housing piece 112, 114.

Figure 8:
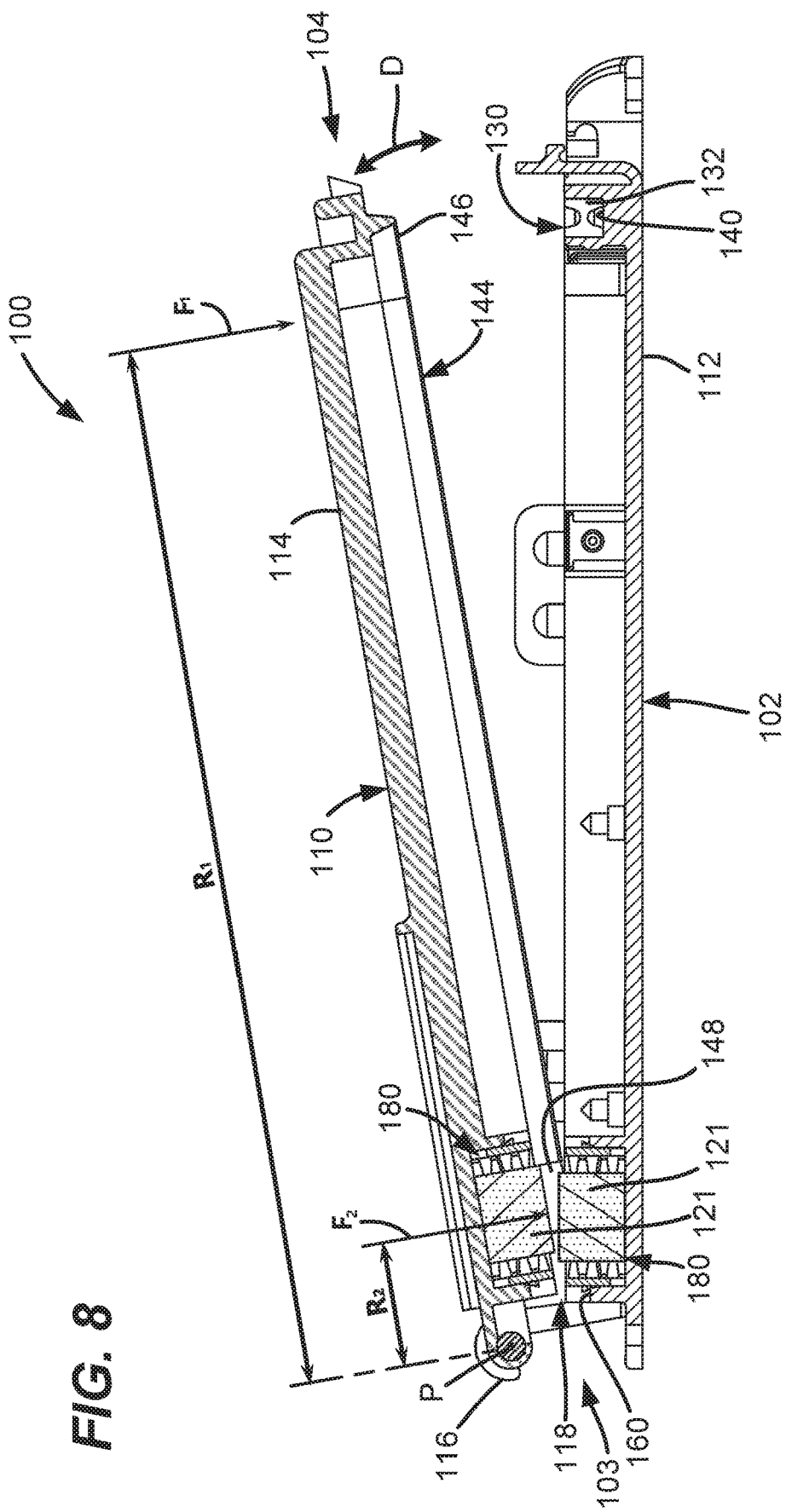
FIG. 8 is a cross-sectional view of the enclosure of FIG. 1 disposed in a partially open configuration where the first and second sealant modules are spaced from each other; the cross-hatching has been removed for ease in viewing.

Referring to FIGS. 8-10, the enclosure 100 is configured such that the first and second housing pieces 112, 114 apply a high compression force to the sealant 121 when the housing 110 is moved to the closed configuration. As noted above, the housing 110 has the cable pass-through location 118 and sealant 121 disposed at the same end (i.e., the first end 103) of the housing 110 as the pivot axis. Accordingly, the second housing piece 114 acts as a moment arm to compress the sealant 121 when a closing force is applied to the second end 104 of the second housing piece 114. In certain examples, the elongate length L of the housing 110 and the positioning of the cable sealing arrangement 120 relative to the pivot axis P enable a reduced closing force F1 for moving the housing 110 to the closed configuration as compared to closing a separate second housing piece 114 straight down on the first housing piece 112. In certain examples, the elongate length L of the housing 110 and the positioning of the cable sealing arrangement 120 relative to the pivot axis P result in an increased compression force F2 applied to the cable sealing arrangement 120 as compared to the compression force that would be applied if closing a separate second housing piece 114 straight down on the first housing piece 112.

The force F2 applied to the sealant 121 (i.e., between the first and second volumes of sealant 123, 124 at the sealing interface 126) can be calculated as:

$$F2 = (F1 * R1)/R2$$

where F1 is the closing/latching force applied to the second end 104 of the housing 110, R1 is the distance between the pivot axis P and the location at which the closing/latching force F1 is applied, and R2 is the distance between the pivot axis P and the location at which the force F2 is applied to the sealant 121.

Accordingly, the compression force applied to the sealant 121 is directly proportional to the ratio between R1 and R2. In certain implementations, the housing 110 and cable sealing arrangement 120 are dimensioned so that the distance R1 is at least three times the distance R2. In certain implementations, the housing 110 and cable sealing arrangement 120 are dimensioned so that the distance R1 is between three times and twelve times the distance R2. In certain implementations, the housing 110 and cable sealing arrangement 120 are dimensioned so that the distance R1 is between four times and ten times the distance R2. In certain implementations, the housing 110 and cable sealing arrangement 120 are dimensioned so that the distance R1 is at least five times the distance R2. In certain implementations, the housing 110 and cable sealing arrangement 120 are dimensioned so that the distance R1 is at least six times the distance R2. In certain implementations, the housing 110 and cable sealing arrangement 120 are dimensioned so that the distance R1 is about eight times the distance R2.

In certain implementations, the housing 110 is configured such that the force applied at the sealant is at least three times the force applied to the end of the housing 110 opposite the pivot axis P when the housing 110 is moved to the closed position. In certain implementations, the housing 110 is configured such that the force applied at the sealant is between three times and twelve times the force applied to the end of the housing 110 opposite the pivot axis P when the housing 110 is moved to the closed position. In certain implementations, the housing 110 is configured such that the force applied at the sealant is at least six times the force applied to the end of the housing 110 opposite the pivot axis P when the housing 110 is moved to the closed position. In certain implementations, the housing 110 is configured such that the force applied at the sealant is at least eight times the force applied to the end of the housing 110 opposite the pivot axis P when the housing 110 is moved to the closed position.

In certain implementations, the housing 110 is elongate along the length L between the first and second ends 103, 104. In various examples, the length L of the housing 110 is at least two, three, four or five times as long as the width W. Because of its long length L, the second housing piece 114 acts as a lever when moved to the closed configuration. In particular, the long length L of the housing 110 results in a long distance R1, which creates a large pressure force exerted on the sealant 121.

In certain implementations, when the housing 110 in the closed configuration, the pivot axis P is offset by a dimension O from the sealing interface 126 in a first orientation that extends along the depth D of the enclosure 100 (e.g., see FIG. 10). In certain examples, the pivot axis P is offset from the sealing interface 126 along the first orientation by a dimension O between 0 and 75 percent of the depth D of the housing 110. In certain examples, the dimension O is at least 10 percent, or at least 20 percent, or at least 30 percent, or at least 40 percent of the depth D of the housing 110. In certain examples, the dimension O is between 20 percent and 50 percent of the depth D of the housing 110.

By offsetting the pivot axis P, the hinge 116 does not obstruct cable access to the cable pass-through location 118. In certain examples, offsetting the pivot axis P allows the hinge pin 117 of the hinge 116 to extend continuously across the width W of the housing 110 (e.g., see FIG. 4).

Figure 7:
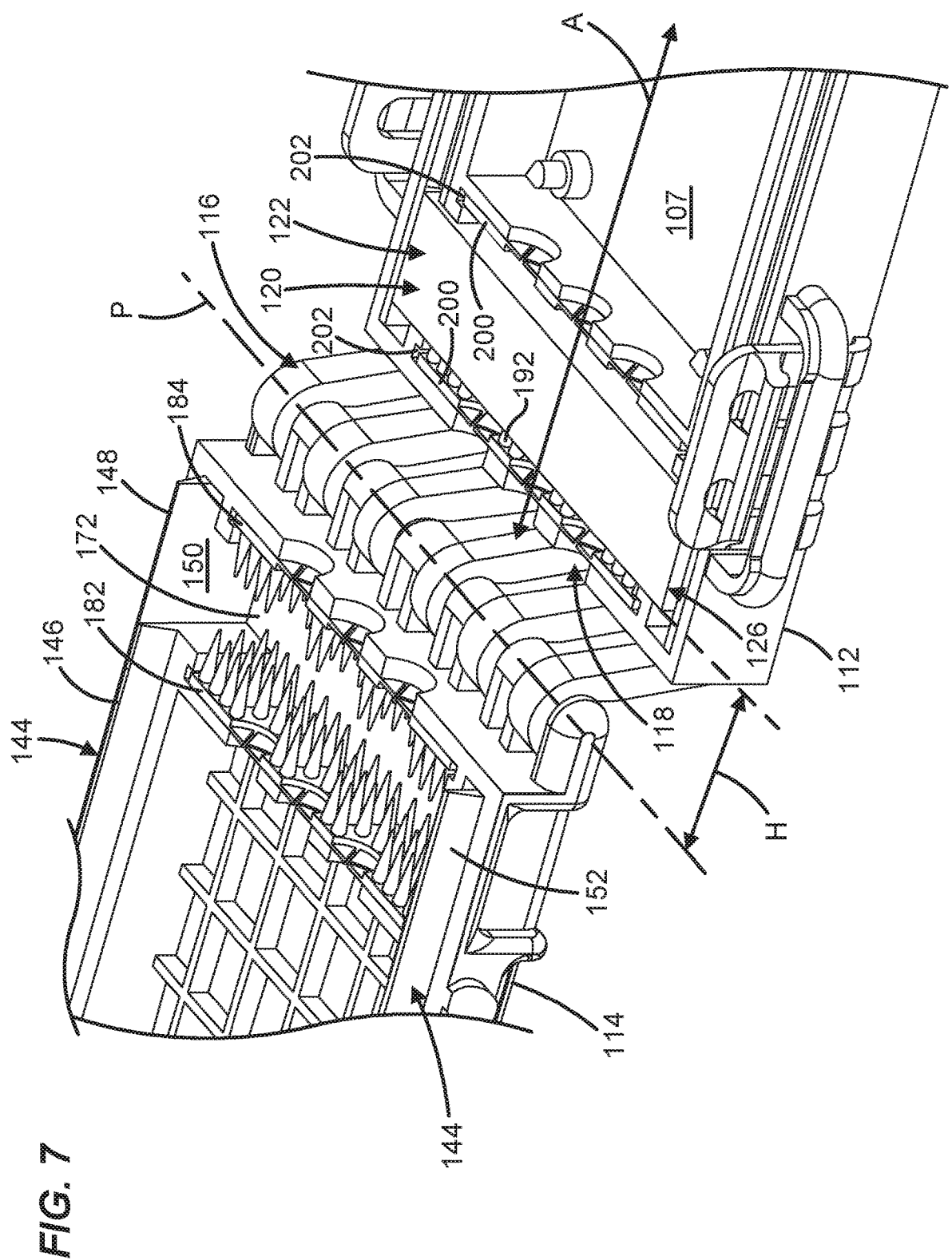
FIG. 7 is an enlarged view of the enclosure with the housing disposed in an open configuration to show a first sealant module disposed at a receptacle of the first housing piece and containment plates of a second sealant module disposed at a receptacle of the second housing piece, the volume of sealant of the second sealant module being removed for ease in viewing the embedment projections of the containment plates.

In certain implementations, the pivot axis P is offset by a dimension H from the sealing interface 126 in a second orientation that extends along the length L of the enclosure 100 (e.g., see FIG. 7). In certain examples, the pivot axis P is offset from the sealing interface 126 along the second orientation by the dimension H between 0 and 75 percent of the depth D of the housing 110. In certain examples, the dimension H is at least 10 percent, or at least 20 percent, or at least 30 percent, or at least 40 percent of the depth D of the housing 110. In certain examples, the dimension H is between 25 percent and 65 percent of the depth D of the housing 110.

The enclosure 100 includes a perimeter seal 130 for sealing between the first and second housing pieces 112, 114 when the housing 110 is in the closed configuration. The perimeter seal 130 seals a majority of a mating interface 138 between the first and second housing pieces 112, 114. In certain implementations, the perimeter seal 130 cooperates with the cable sealing arrangement 120 to seal the mating interface 138 between the first and second housing pieces 112, 114.

The perimeter seal 130 includes a main portion 132 extending between a first end portion 134 and a second end portion 136. In certain examples, the first and second end portions 134, 136 are disposed at opposite sides 105, 106 of the housing 110. In certain examples, the main portion 132 of the perimeter seal 130 has a U-shaped configuration. The main portion 132 of the perimeter seal 130 that is located within the channel 140 has an H-shaped transverse cross-sectional profile (e.g., see FIGS. 8-10).

In certain examples, the end portions 134, 136 have a different cross-sectional profile than the main portion 132. For example, the end portions 134, 136 may be thinner and/or flatter than the main portion 132. In examples, the first and second end portions 134, 136 of the perimeter seal 130 are generally flat. The cable sealing arrangement 120 extends across a spacing between the first and second end portions 134, 136 of the perimeter seal 130. Opposite ends 123, 129 of the cable sealing arrangement 120 are positioned adjacent the first and second end portions 134, 136 of the perimeter seal 130.

In certain implementations, the perimeter seal 130 is carried by one of the first and second housing pieces 112, 114. In the example shown, the perimeter seal 130 is carried by the first housing piece 112. In certain examples, the housing piece carrying the perimeter seal 130 includes a channel 140 for containing the main portion 132 of the perimeter seal 130. Each of the end portions 134, 136 includes a retention tab 135 extending towards the opposite end portion 136, 134. The first housing piece 112 defines pockets 137 at which the retention tabs 135 are received when the perimeter seal 130 is installed at the first housing piece 112.

The other of the first and second housing pieces 112, 114 includes a main body 142 and a sealing projection 144 that is unitary with the main body 142. In the example shown, the second housing piece 114 has the sealing projection 144. The sealing projection 144 includes a primary portion 146 that extends along the mating interface 138 and engages the main portion 132 of the perimeter seal 130 within the channel 140 when the housing 110 is in the closed configuration. For example, the sealing projection 144 may have a wedge shape that fits within the H-shaped main portion 132 of the perimeter seal 130 (e.g., see FIG. 10).

Locating the cable sealing arrangement 120 at the same end 103 as the pivot axis P and offsetting the pivot axis P by the dimension O causes pressure to be applied to the cable sealing arrangement 120 before pressure is applied to the perimeter seal 130. For example, the first and second housing pieces 112, 114 define an angle of between about three degrees and about ten degrees when the first and second volumes of sealant 122, 124 initially make contact with one another as the housing 110 is pivoted toward the closed configuration. In certain examples, the first and second housing pieces 112, 114 define an angle of between about five degrees and about eight degrees when the first and second volumes of sealant 122, 124 initially make contact with one another as the housing 110 is pivoted toward the closed configuration. In certain examples, the first and second housing pieces about seven degrees when the first and second volumes of sealant 122, 124 initially make contact with one another as the housing 110 is pivoted toward the closed configuration.

Offsetting the pivot axis P from the sealing interface points 126, 138 reduces a transverse wipe action between the primary portion 146 of the sealing projection 144 and the main portion 132 of the perimeter seal 130. In certain examples, part of the primary portion 146 has a near vertical engagement with a portion of the main portion 132 of the perimeter seal 130. In certain examples, a majority of the primary portion 146 of the sealing projection 144 has a near vertical engagement with a majority of the main portion 132 of the perimeter seal 130.

Figure 4:
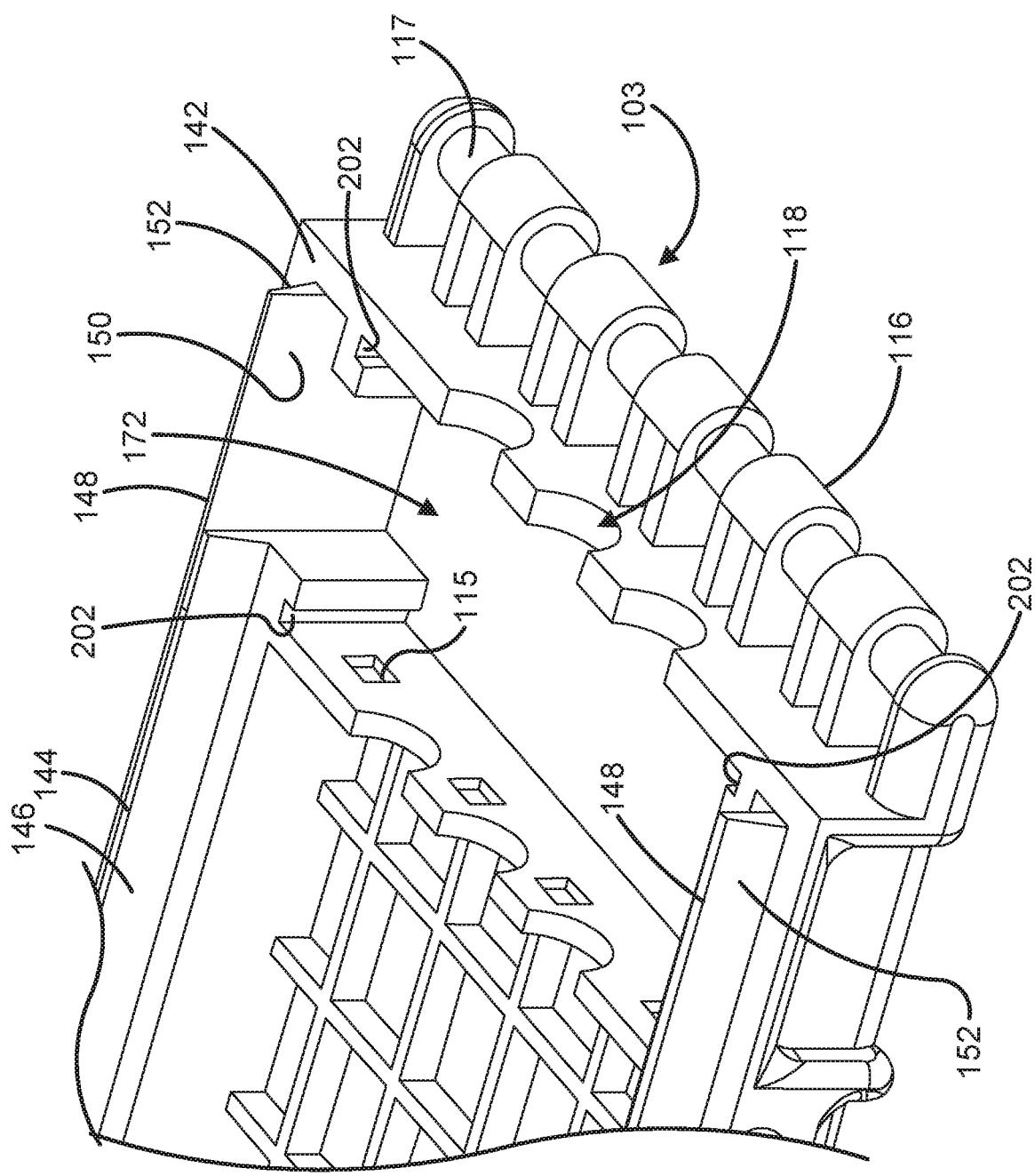
FIG. 4 is a perspective view of a portion of a second housing piece with a second sealant module of the cable sealing arrangement removed for ease in viewing the second receptacle.

The sealing projection 144 also includes seal containment portions 148 that extend beyond the channel 140 towards the first end 103 of the housing 110 (e.g., see FIGS. 4 and 7). The seal containment portions 148 also extend beyond the sealant module 180 and into the first housing piece 112 when the housing 110 is disposed in the closed position (e.g., see FIGS. 2 and 8). The seal containment portions 148 prevent the sealant 121 of the cable sealing arrangement 120 from extruding into the space designated for the perimeter seal 130 when the housing 110 is moved to the closed configuration.

The seal containment portions 148 are disposed at the ends 123, 125 of the cable sealing arrangement 120 and at the first and second end portions 134, 136 of the perimeter seal 130. As the housing 110 is moving to the closed configuration, the seal containment portions 148 slide or otherwise move between the cable sealing arrangement 120 and the end portions 134, 136 of the perimeter seal 130 before the second volume of sealant 124 contacts the first volume of sealant 122 (e.g., see FIG. 8). Accordingly, the seal containment portions 148 block the volumes of sealant 122, 124 from extruding into the H-shaped portion 132 of the perimeter seal 130 or into the channel 144.

When the housing 110 is in the closed configuration, the first and second volumes of sealant 122, 124 contact and are at least partially contained between inner sides 150 of the seal containment portions 148. The inner sides 150 of the seal containment portions 148 are oriented generally parallel to a direction D (FIG. 8) of relative movement between the first and second housing piece 112, 114 as the housing 110 is moved between the open and closed configuration.

The first and second end portions 134, 136 of the perimeter seal 130 are compressed between outer sides 152 of the seal containment portions 148 and the first housing piece 112 when the housing 110 is in the closed configuration. In examples, the first and second end portions 134, 136 are oriented generally parallel with respect to the outer sides 152 of the seal containment portions 148. The outer sides 152 of the seal containment portions 148 are oriented generally parallel to a direction of relative movement between the first and second housing piece 112, 114 as the housing 110 is moved between the open and closed configuration.

Aspects of the Disclosure

Aspect 1. An enclosure comprising:
 a housing extending along a length between opposite first and second ends, along a width between opposite sides, and along a depth between a front and a rear, the housing being elongate along the length, the housing defining a cable pass-through location at the first end, the housing including a first housing piece and a second housing piece that pivotally couple together at the first end of the housing so that the housing is movable between a closed configuration and an open configuration.

Aspect 2. The enclosure of aspect 1, further comprising a cable sealing arrangement disposed at the cable pass-through location.

Aspect 3. The enclosure of aspect 2, wherein the cable sealing arrangement includes a first sealant module carried by the first housing piece and a second sealant module carried by the second housing piece, wherein sealant of the first and second sealant modules engages when the housing is disposed in the closed configuration.

Aspect 4. The enclosure of aspect 3, wherein each sealant module includes a volume of sealant disposed between two containment plates.

Aspect 5. The enclosure of aspect 4, wherein each containment plate includes embedment projections that extend into the volume of sealant.

Aspect 6. The enclosure of any of aspects 4 and 5, wherein each containment plate includes flexible tabs that facilitate installation of the sealant module.

Aspect 7. The enclosure of aspect 6, wherein each containment plate includes one or more snap-fit elements offset from the flexible tabs.

Aspect 8. The enclosure of any of aspects 3-7, wherein the first and second housing pieces couple together to pivot about a pivot axis, the pivot axis being offset from a sealing interface between the first and second sealant modules.

Aspect 9. The enclosure of any of aspects 1-7, wherein the first and second housing pieces couple together to pivot about a pivot axis, the pivot axis being offset from a sealing interface between the first and second housing pieces.

Aspect 10. The enclosure of any of aspects 1-9, further comprising a perimeter seal carried by one of the first and second housing pieces, the perimeter seal extending along a majority of a perimeter of the one housing piece, wherein the other of the first and second housing pieces includes a sealing projection that wipes against the perimeter seal when the housing is moved to the closed configuration.

Aspect 11. The enclosure of aspect 10, wherein the perimeter seal includes end portions that are flatter than a majority of the perimeter seal, and wherein the sealing projection includes containment portions that align with the end portions of the perimeter seal and with ends of the sealant of the first sealant module.

Aspect 12. The enclosure of aspect 10, wherein the sealing projection includes containment portions that contain deformation of the sealant of the cable sealing arrangement to inhibit interference with the perimeter seal.

Aspect 13. An enclosure having an elongate length extending between opposite first and second ends, the enclosure having a width and a depth that are each less than half of the length, the enclosure comprising:
a first housing piece extending along the length of the enclosure, the first housing piece carrying a first sealant module at the first end of the enclosure;
a second housing piece extending along the length of the enclosure, the second housing piece carrying a second sealant module at the first end of the enclosure, the first and second housing pieces being pivotally coupled together to pivot about a pivot axis between an open configuration and a closed configuration, the first and second housing pieces cooperating to define an interior of the enclosure when in the closed configuration, the first and second sealant modules mating at a sealing interface when the enclosure is in the closed configuration;
a cable port disposed at the first end of the enclosure so that any cable passing through the cable port will extend through the sealing interface to reach the interior of the enclosure; and
whereby the first housing piece functions as a lever to apply a compression force at the sealing interface during movement from the open configuration to the closed configuration, whereby the elongate length of the housing functions as a multiplier for the compression force being applied at the sealing interface.

Aspect 14. The enclosure of aspect 13, wherein the first and second sealant modules each include a hydrosilation cured vinyl-terminated polydimethylsiloxane (PDMS) gel.

Aspect 15. The enclosure of any of aspects 13-14, wherein the pivot axis is offset from the sealing interface along the depth of the housing.

Aspect 16. The enclosure of any of aspects 13-15, wherein a ratio of a distance between the pivot axis and the second end of the housing and a distance between the pivot axis and the sealant modules ranges between 3 and 12.

Aspect 17. The enclosure of aspect 16, wherein the ratio is between 6 and 10.

Aspect 18. The enclosure of aspect 16, wherein the ratio is about 8.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An enclosure comprising:
a housing including first and second housing pieces pivotally moveable relative to one another to move the housing between an open configuration and a closed configuration, the first and second housing pieces mating together and cooperating to define an interior of the housing when the housing is in the closed configuration, the interior of the housing being accessible when the housing is in the open configuration, the housing having a length, a width, and a depth, the first and second housing pieces each extending along the length of the housing and cooperating to define first and second ends of the housing separated by the length, the housing being elongate along the length, the first and second housing pieces each extending across the width of the housing, and the first and second housing pieces cooperating to define the depth of the housing;
a cable pass-through location provided at the first end of the housing for routing cables through the first end of the housing into the interior of the housing;
a sealant positioned at the cable pass-through location for sealing cables routed through the pass-through location, the sealant extending across the width of the housing, the sealant including a first volume of sealant carried by the first housing piece and a second volume of sealant carried by the second housing piece, the first and second volumes of sealant meeting at a sealing interface at least when the housing is in the closed configuration, wherein cables routed through the cable pass-through location are passed between the first and second volumes of sealant at the sealing interface; and
the housing including a hinge at the first end for allowing pivotal movement between the first and second housing pieces such that the housing can be moved between the open and closed configuration, the hinge including a pivot axis at the first end of the housing that extends across the width of the housing.

2. The enclosure of claim 1, wherein the enclosure is configured such that the first and second housing pieces define an angle of between 3 degrees and 10 degrees when the first and second volumes of sealant initially make contact with one another as the housing is pivoted toward the closed configuration.

3. The enclosure of claim 1, wherein when the housing is in the closed configuration, the pivot axis is offset from the sealing interface in a first orientation that extends along the depth of the enclosure.

4. The enclosure of claim 1, wherein the pivot axis is offset from the sealing interface by a first distance along the depth of the housing and by a second distance along the length of the housing, each of the first and second distances being at least 20 percent of the depth of the housing.

5. The enclosure of claim 1, wherein the housing includes first and second opposite sides separated by the width, wherein the first and second sides extend along the length between the first and second ends of the housing, wherein the enclosure incudes a perimeter seal for sealing between the first and second housing pieces when the housing is in the closed configuration, the perimeter seal including a first portion that extends along the first side of the housing, a second portion that extends around the second end of the housing, and a third portion that extends along the second side of the housing, wherein the length is at least two times as a large as the width, wherein the width is larger than the depth, wherein the first and second ends of the housing are each defined by the width and the depth of the housing, and wherein the sealant of the cable pass-through location extends across the width fully from the first portion of the perimeter seal at the first side of the housing to the third portion of the perimeter seal at the second side of the housing.

6. The enclosure of claim 1, wherein the length is at least three times as long as the width.

7. An enclosure comprising:
a housing including first and second housing pieces pivotally moveable relative to one another to move the housing between an open configuration and a closed configuration, the first and second housing pieces mating together and cooperating to define an interior of the housing when the housing is in the closed configuration, the interior of the housing being accessible when the housing is in the open configuration, the housing having a length, a width and a depth, the first and second housing pieces each extending along the length of the housing and cooperating to define first and second ends of the housing separated by the length, the housing being elongate along the length, the first and second housing pieces each extending across the width of the housing, and the first and second housing pieces cooperating to define the depth of the housing;
a cable pass-through location provided at the first end of the housing for routing cables through the first end of the housing between the first and second housing pieces into the interior of the housing;
a sealant positioned at the cable pass-through location for sealing cables routed through the pass-through location, wherein cables routed through the cable pass-through location are passed through the sealant at a sealing interface; and
the housing including a hinge at the first end for allowing pivotal movement between the first and second housing pieces such that the housing can be moved between the open and closed configuration, the hinge including a pivot axis at the first end of the housing that extends across the width of the housing, wherein the cable pass-through location is configured for routing cables into the interior of the housing along cable pass-through axes that are perpendicular to the pivot axis of the hinge and parallel to the length of the housing, wherein the first and second ends of the housing are each defined by the width and the depth of the housing, and wherein the sealant extends across at least a majority of the depth and the width of the housing.

8. The enclosure of claim 7, wherein when the housing is in the closed configuration, the pivot axis is offset from the sealing interface in a first orientation that extends along the depth of the enclosure.

9. The enclosure of claim 8, wherein the pivot axis is offset from the sealing interface along the first orientation by a dimension that is at least 20 percent of the depth of the housing.

10. The enclosure of claim 7, wherein the housing includes first and second opposite sides separated by the width, wherein the first and second sides extend along the length between the first and second ends of the housing, wherein the enclosure includes a perimeter seal for sealing between the first and second housing pieces when the housing is in the closed configuration, the perimeter seal including a first portion that extends along the first side of the housing, a second portion that extends around the second end of the housing, and a third portion that extends along the second side of the housing.

11. The enclosure of claim 7, wherein the length is at least two times as long as the width.

12. An enclosure comprising:
a housing defining an interior and having a length extending between opposite first and second ends of the housing, a width extending between opposite first and second sides of the housing, and a depth extending between a front and a rear of the housing, the length of the housing being at least twice the width, the length also being at least twice the depth, the housing including a first housing piece defining the front of the housing and a second housing piece defining the rear of the housing, the first and second housing pieces cooperating to define the first and second ends and the first and second sides of the housing, the first and second housing pieces being pivotally coupled together so that the first and second housing pieces pivot relative to each other between an open configuration of the housing and a closed configuration of the housing;
a cable pass-through location disposed at the first end of the housing, the cable pass-through location including a cable port defined through the first end of the housing to provide cable access to the interior of the housing from an exterior of the housing;
a cable sealing arrangement disposed within the interior of the housing at the first end of the housing, the cable sealing arrangement including a first sealant carried by the first housing piece and a second sealant carried by the second housing piece, the first and second sealants contacting each other at a sealing interface at least when the housing is disposed in the closed configuration; and
a pivot axis about which the first and second housing pieces pivot between the open configuration and the closed configuration, the pivot axis being disposed at the first end of the housing, the pivot axis being offset from the sealing interface along the depth of the housing by a distance that is at least 20 percent of the depth.

13. The enclosure of claim 12, wherein the first and second sealants each include a hydrosilation cured vinyl-terminated polydimethylsiloxane (PDMS) gel.

14. An enclosure having an elongate length extending between opposite first and second ends, the enclosure comprising:
- a first housing piece extending along the length of the enclosure, the first housing piece carrying a first sealant module at the first end of the enclosure;
- a second housing piece extending along the length of the enclosure, the second housing piece carrying a second sealant module at the first end of the enclosure, the first and second housing pieces being pivotally coupled together at the first end of the enclosure to pivot about a pivot axis between an open configuration and a closed configuration, the first and second housing pieces cooperating to define an interior of the enclosure when in the closed configuration, the first and second sealant modules mating at a sealing interface when the enclosure is in the closed configuration; and
- a cable port disposed at the first end of the enclosure so that any cable passing through the cable port will extend through the sealing interface to reach the interior of the enclosure;
- wherein a first distance along the length between the pivot axis and the second end of the housing is between three and twelve times longer than a second distance along the length between the pivot axis and a mid-location of the first sealant module.

15. The enclosure of claim 14, wherein the first distance is about eight times as long as the second distance.

16. The enclosure of claim 1, wherein the length is at least two times as a large as the width, wherein the width is larger than the depth, wherein the first and second ends of the housing are each defined by the width and the depth, and wherein the sealant of the cable pass-through location extends across at least a majority of the width of the housing.

17. The enclosure of claim 1, wherein the length is at least two times as a large as the width, wherein the width is larger than the depth, wherein the first and second ends of the housing are each defined by the width and the depth, and wherein the sealant of the cable pass-through location extends across at least a majority of the width of the housing and also at least a majority of the depth of the housing.

18. The enclosure of claim 1, wherein the cable pass-through location is configured for routing cables into the interior of the housing along cable pass-through axes that are perpendicular to the pivot axis of the hinge and parallel to the length of the housing.

* * * * *